May 30, 1933.  C. R. SHORT  1,912,101

THRUST BEARING WITH POROUS METAL BEARING SURFACE

Filed Dec. 21, 1927

Inventor
Charles R. Short
By Spencer Hardman and Fehr
Attorneys

Patented May 30, 1933

1,912,101

UNITED STATES PATENT OFFICE

CHARLES R. SHORT, OF DETROIT, MICHIGAN, ASSIGNOR TO THE MORAINE PRODUCTS COMPANY, OF DAYTON, OHIO, A CORPORATION OF OHIO

THRUST BEARING WITH POROUS METAL BEARING SURFACE

Application filed December 21, 1927. Serial No. 241,657.

This invention relates to bearings and more particularly to thrust bearings. While the invention contemplates the provision of thrust bearings of general application, a bearing made in accordance with this invention is particularly useful as the release bearing of an automobile clutch.

It has been found difficult heretofore to provide thrust bearings which can be satisfactorily lubricated. Various forms of thrust bearings have been constructed, some of which have been lubricated by supplying lubricant at intervals from an external source. It has been difficult to retain the lubricant on the bearing surfaces, however, and bearings of this type have proven generally unsatisfactory. Thrust bearings have also been made with one of the contacting parts formed of a compound containing graphite, but the lubrication has been inadequate and friction between the relatively moving parts of this form of bearing is sufficient to cause very objectionable wear. Moreover graphite compounds have little strength and durability and bearings formed therewith have been found to be noisy.

It is therefore, an object of this invention to provide a bearing of the character described which can be satisfactorily lubricated and is made of sufficiently durable material to operate successfully.

It is a further object of this invention to provide a bearing of the character described that will automatically lubricate itself so as to require no attention from the operator of the machine in which it is used.

Briefly these objects are accomplished according to the present invention by providing a thrust bearing having a bearing face formed of porous metallic material capable of absorbing a lubricant which is secured to a supporting member of steel or other dense strong metal so constructed as to have a chamber formed therein to provide a reservoir for oil. The porous metallic bearing face is secured to a reinforcing plate by means of a metallic bond welding or in any other desirable way and the plate is secured to the supporting member in such a way that projections on the porous bearing surface which extend through the plate are in contact with the oil in the above described reservoir. As the oil in the bearing face is used up during operation of the bearing oil is absorbed by the porous metallic structure by contact with the oil in the reservoir.

Further objects and advantages of the present invention will be apparent from the following description, reference being had to the accompanying drawing, wherein a preferred form of embodiment of the present invention is clearly shown.

For convenience the bearing forming the subject of the present invention is illustrated as the clutch release bearing in an automobile clutch, but the bearing is in no way limited in its use and may be employed as a thrust bearing of entirely general application.

Figures 1, 2:
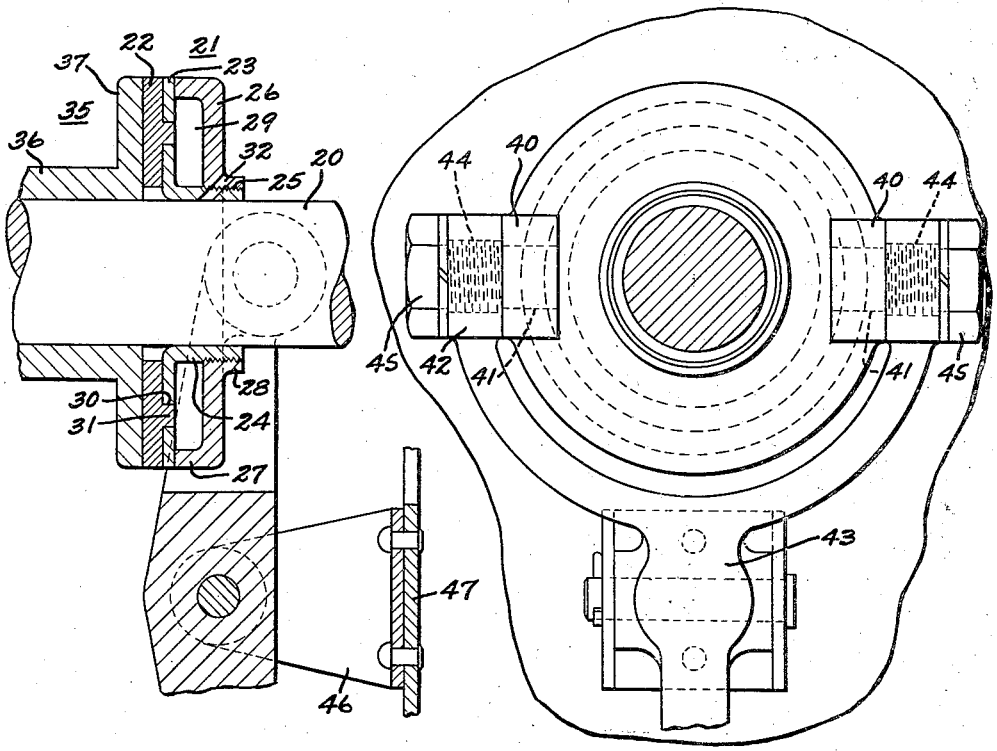
Fig. 1 is a fragmentary sectional view of a bearing according to the present invention and operating means therefor.
Fig. 2 is an elevation of the structure shown in Fig. 1 viewed from the right.

Referring to Fig. 1 of the drawing the reference numeral 20 indicates a shaft surrounding which is the thrust bearing indicated in its entirety by the reference number 21. The bearing comprises a bearing surface in the form of an annular plate 22 made of porous metallic material capable of absorbing a lubricant and secured by means hereinafter described to a reinforcing plate 23 of steel or other strong metal. The specific materials used and specific method of forming the porous metallic element 22 constitutes no part of the present invention. A suitable formula and method of manufacture is described in the patent to H. M. Williams 1,642,347. Briefly, according to the method described in the patent, a mixture of suitable metal powders, such as copper and tin, graphite and a volatile void forming substance such as salicylic acid are briquetted in the desired form at a pressure of 60,000 to 75,000 pounds per square inch. The element, formed in this way, is then sintered in a nonoxidizing atmosphere at a temperature and for a time sufficient to cause alloyage of the metals and volatilization of the salicylic acid, which will leave throughout the metallic structure a large number of minute intercommunicating voids. The element is then adapted to be immersed for a predetermined time in a bath of hot lubricating oil which is absorbed by the element, filling the voids referred to. The bearing face 22 may be made in the manner described or in any other suitable way.

The metal plate 23 is in the form of a flange extending from a central, cylindrical portion 24 which surrounds and is adapted to slide on the shaft 20 for a purpose later set forth. This cylindrical part is externally threaded at 25 and is screwed into a central opening in an annular member 26 of steel or other strong metal. The member 26 is of slightly less diameter than the members 22 and 23, and is provided at its outer edge with a projecting rim 27 against the edge of which the member 23 is held tight when the element 23 and 26 are screwed together. A projecting flange 28 is provided on the member 26 surrounding the central opening in said member. The flange 28 forms a neck portion which is threaded on its inner surface to engage the threads 25 on member 23.

The flat parts of members 23 and 26, the cylindrical part 24 and rim 27 constitute walls surrounding a chamber 29 which is adapted to be filled with lubricating oil when the bearing is assembled, or a removable plug may be provided in the member 26 to permit filling of chamber 29. The flat portion of member 23 is provided with holes 30 and lugs 31 projecting from the porous metallic plate 22 are received in said holes so that such lugs will be in contact with the oil in chamber 29, which will be absorbed by the plate 22 through said lugs to keep said plate impregnated with oil, as that originally absorbed thereby is consumed during operation of the bearing. A packing washer (not shown) may be employed, if necessary, between the rim 27 and member 23 to provide an oil tight joint.

A hole 32 is shown extending through the neck 28 and cylindrical part 24. A flexible tube leading to an oil cup, is adapted to be connected in the hole 32 or if desired oil may be applied manually at intervals through said hole, for the purpose of lubricating the shaft 20 and contacting parts of the thrust bearing.

The bearing member above described is adapted to be moved longitudinally of the shaft 20 to engage a cooperating member 35, also slidable of shaft 20, to effect release of the clutch. The member 35 surrounds the shaft 20 and has a projecting annular flange 37 of the same size as the bearing surface 22 which contacts therewith when the clutch is to be released. The element 35 rotates with the shaft when the clutch is closed so that when the thrust bearing is moved to the left in Fig. 1 the bearing surface 22 which is not rotating is brought into engagement with the rotating flange 37, which would result in very considerable sliding friction between the engaging surfaces, unless said surfaces were well lubricated.

To move the bearing member as above described the member 26 is provided with lugs 40 on the flat surface thereof, having holes 41 therein. These lugs are adapted to be received within the ends 42 of a bifurcated lever 43, holes 44 in said ends 42 registering with the holes 41. Pivot pins 45 are screwed into the holes 44, the ends of said pins extending into holes 41 to provide a pivotal connection between the lever 43 and member 26. The lever 43 is fulcrumed intermediate its ends in a supporting bracket 46 secured to some convenient part of the automobile frame 47. The above operating mechanism constitutes no part of the present invention, but forms a convenient means for operating the bearing when the latter is used as a clutch release bearing.

Figures 3, 4, 5:
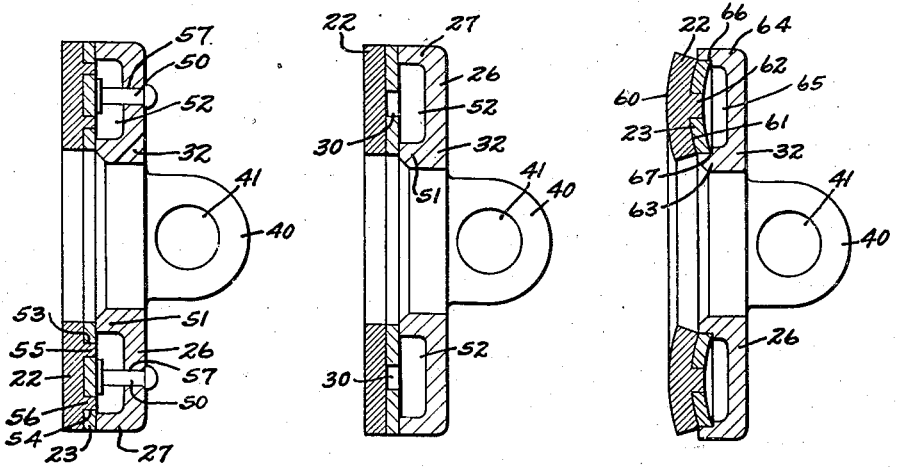
Figs. 3, 4 and 5 are detail sections through bearings constituting modified forms of the invention.

The bearings disclosed in Figs. 3, 4 and 5 are of the same general construction as that already described and differ therefrom primarily in the manner of securing the annular member 23 to the supporting member 26. In the form shown in Fig. 3, the annular member 23 is provided with rivets 50 secured thereto by welding or in any other suitable manner. The member 26 is provided with the outer projecting rim 27 hereinbefore described and an additional inner rim 51 concentric with the rim 27. The two rims forming between them a channel which is closed by the member 23 which seats on the rims 27 and 51 forming an oil chamber 52 similar to the chamber 29. A plurality of holes 53 and 54 are provided in the member 23 and lugs 55 and 56 projecting from the member 22 are received in said holes and contact with the oil to effect the same result as the lugs 31 previously described. The rivets 50 project through holes 57 in the member 26 and when the heads of such rivets are hammered out will hold the member 23 against the rims 27 and 51. Packing washers may be positioned between the rims and the member 23, if they be necessary, to form a tight joint.

In the form disclosed in Fig. 4 the member 23 is of the same form as shown in Fig. 1, while the member 26 is provided with inner and outer rims 51 and 27, respectively as shown in Fig. 3. The member 23 is adapted to be secured to member 26 by welding the said member to the contacting surfaces of rims 27 and 51, forming a closed oil chamber as described in connection with Fig. 3. It will be noted that in this form of the invention the porous metallic element 22 is not provided with the above described projections 31, the rear face of the element 22 being formed flat. Holes 31 are provided, however, in the member 23, to permit oil in the reservoir 52 to come in contact with the rear face of element 22 to enable said element to absorb oil from the reservoir. It should be obvious that the element 22 in the form of invention disclosed in Fig. 1 could also be made without the projections 31.

Fig. 5 discloses a modification of the invention in which the porous metallic bearing surface 22 is formed with a convex forward face 60 adapted to engage the member 37 shown in Fig. 1. The rear face 61 of the bearing surface or lining 22 is of concave form and is secured by metallic bond or other desirable means to the convex front face of the annular steel reinforcing plate 23 provided with a concave rear face as shown in Fig. 5, the rear face of the element 22 being provided with projecting portions 62 similar to the projections 31. The supporting member 26 is provided with inner and outer circular and concentric rims 63 and 64 forming an oil channel 65 between them. The rims 63 and 64 are countersunk on the sides adjacent the oil channel to form shoulders 66 and 67, providing seats for the annular steel member 23. Because of the concavo-convex form of the member 23 it may be sprung into position on said shoulders 66 and 67 and the inherent elasticity of the steel will hold said member tight in position. The oil hole 32 is also provided in this form of the invention.

A removable plug may be provided in the member 26, adapted to be removed for filling the oil reservoir in said member, or the latter may be filled before the member 23 is sprung into position, or may be filled in any other desirable manner.

In addition to the various specific means disclosed herein for securing the annular plate 23 to the supporting member 26 other means might be employed, for instance the plate might be received between concentric rims or flanges projecting from said member 26 and such flanges spun over the edges of the member 23 to retain said member in fixed position relative to the member 26.

While the form of embodiment of the present invention as herein disclosed, constitutes a preferred form, it is to be understood that other forms might be adopted, all coming within the scope of the claims which follow.

What is claimed is as follows:

1. A bearing comprising: an oil-impregnated finely-porous metal lining, a relatively stronger and denser reinforcing metal back surface bonded to said porous lining, and an oil reservoir located adjacent to but beyond said back from said lining, said metal back having apertures therethrough of such size as to restrict the flow of oil to the bearing surface and to prevent said lining from absorbing an excess of oil at all times, whereby a constant supply of oil is provided to said lining.

2. A bearing comprising: an oil-impregnated porous metal lining, an oil reservoir having walls extending toward said lining, and a back member of oil-impervious material supporting said lining upon said walls and separating said lining from the interior of said reservoir, said back member being perforated so as to supply oil from said reservoir to said lining, to restrict the flow of oil to the bearing surface and to prevent said lining from absorbing an excess of oil at all times, whereby a constant supply of oil is provided to said lining.

In testimony whereof I hereto affix my signature.

CHARLES R. SHORT.